(12) United States Patent
Hanke et al.

(10) Patent No.: US 6,770,713 B2
(45) Date of Patent: Aug. 3, 2004

(54) COMPATBILIZER AND MODIFIER FOR POLYMERIC COMPOSITIONS COMPRISING POLYOLEFINS

(75) Inventors: Bernhard Hanke, Bad Schwalbach (DE); Bernhard Rieger, Oberelchingen (DE); Valeri Alexandrovich Dyatlov, Moscow (RU); Mike Orroth, Surrey (GB); Gian De Belder, Aartselaar (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/239,533

(22) PCT Filed: Mar. 20, 2001

(86) PCT No.: PCT/US01/09331
§ 371 (c)(1),
(2), (4) Date: Nov. 26, 2002

(87) PCT Pub. No.: WO01/70879
PCT Pub. Date: Sep. 27, 2001

(65) Prior Publication Data
US 2004/0019139 A1 Jan. 29, 2004

(30) Foreign Application Priority Data
Mar. 23, 2000 (EP) .............................................. 00106298

(51) Int. Cl.⁷ ............................ C08L 23/00; C08L 23/04
(52) U.S. Cl. ........................................ 525/191; 525/240
(58) Field of Search ................................ 525/191, 240

(56) References Cited

U.S. PATENT DOCUMENTS 6,476,135 B1 * 11/2002 Bugada et al. .............. 525/191
6,555,643 B1 * 4/2003 Rieger ........................ 526/351

FOREIGN PATENT DOCUMENTS

WO   WO 96 20225 A   7/1996
WO   WO 99 52955 A   10/1999

OTHER PUBLICATIONS

Abstract: Database WPI, Section Ch, Week 197430, Derwent Publications Ltd., London, GB; AN 1974-54273V, XP002139875 & JP 48 096638 A (Mitsubishi Petrochemical Co., Lt.d.), Dec. 10, 1973).

* cited by examiner

Primary Examiner—Nathan M. Nutter
(74) Attorney, Agent, or Firm—Angela Marie Stone

(57) ABSTRACT

The present invention relates to polymeric compositions comprising at least one polyolefin and a compatibilizer and/or a modifier. The polymeric composition comprises a first component and a second component, the first component being a first polymeric material comprising C2 to C20 linear or branched stereoregular polyolefins. The second component is a polyolefinic homopolymer having an isotacticity within the range of 25% to 60% of [mmmm] pentad concentration.

12 Claims, No Drawings

COMPATBILIZER AND MODIFIER FOR POLYMERIC COMPOSITIONS COMPRISING POLYOLEFINS

FIELD OF THE INVENTION

The present invention relates to polymeric compositions comprising at least one polyolefin and a compatibilizer and/or a modifier.

BACKGROUND

Stereoregular polypropylene and in particular isotactic polypropylene enjoys widespread usage throughout the industry. For example, isotactic polypropylenes, polymeric blends as well as plastic materials based on isotactic polypropylene are applied for the manufacture of films, fibers, bodies, foams, adhesives, coverings, and the like. The manufacture of isotactic polypropylene such as by metallocomplex catalysis polymerization reaction is well known in the art.

The manufacture of syndiotactic polypropylene and atactic polypropylene is also well known in the art. Due to their material properties, however, the latter two materials as such do not lend themselves to widespread industrial usage.

Isotactic polypropylene is a highly crystalline polymer. Accordingly, isotactic polypropylene is a brittle, stiff material with high tensile strength. It can be processed successfully without thermal destruction due to its low melting point. For the alteration of the material properties, however, for example a platicizer is required. Syndiotactic polypropylene is also a highly crystalline polymer but syndiotactic polypropylene is very difficult to process thermally because of its high melting point. Atactic polypropylene is amorphous at room temperature and accordingly has poor mechanical properties and is sticky at room temperature.

It is a generally known technique to form compositions of polymers having different properties in order to adjust the material properties of the individual polymers. It is particularly desirable to mix polymers of the same monomer but with differing stereo chemistry. However, in the case of polyolefins and in particular in the case of polypropylene the known polymers having differing stereo chemistry are completely immiscible.

Therefore, it is an object of the present invention to provide a polymeric composition which overcomes the disadvantages of the prior art polymeric compositions.

It is a further object of the present invention to provide a polymeric composition in which the material properties such as impact resistance, elasticity, and extensibility of the basic polymeric can be adjusted by adding a variable amount of the same polymer with a different stereo chemistry, in particular with a polymeric composition comprising a polyolefin, preferably polypropylene.

It is a further object the present invention to provide a polymeric composition which comprises a first component and a second component which are immiscible and which comprises a third component acting as a compatibilizer to stabilize the polymeric composition.

It is a further object of the present invention to provide a method for blending two immiscible polymeric materials such as two polyolefins, in particular polypropylenes with differing stereo chemistry.

SUMMARY OF THE INVENTION

The present invention provides a polymeric composition comprising a first component and a second component, said first component being a first polymeric material comprising C2 to C20 linear or branched stereoregular polyolefins, characterized in that said second component is a second polyolefinic homopolymer having an isotacticity within the range of 25% to 60% of [mmmm] pentad concentration.

DETAILED DESCRIPTION OF THE INVENTION

It is one aspect of the present invention to provide a polymeric composition in which the properties of the first component are adjustable by adding a variable amount of a second component.

The polymeric composition of the present invention comprises a first component which is a polymeric material comprising a C2 to C20 linear or branched stereo regular polyolefin. Preferably, the polyolefin is polypropylene. More preferably, the polypropylene is isotactic and, most preferably, the isotactic polypropylene is linear. The manufacture of this first component is well known in the art such as for example by metallocomplex catalysis polymerization.

The polymeric composition of the present invention further comprises a second component which is a polyolefinic homopolymer.

The term "polyolefinic homopolymer" as used herein refers to those polyolefins which comprise only one phase of molecules all of which exhibiting a similar stereochemical configuration. For example, blends of atactic and isotactic polymers where the two phases have polymerized simultaneously are excluded when this term is used. The term homopolymer includes copolymers where all molecules exhibit a similar stereochemical configuration.

The polyolefinic homopolymer of the present invention may comprise linear isotactic polymers having a structure of one or several $C_3$ to $C_{20}$ olefinic monomers, having an isotacticity of less than 60%, preferably less than 55%, more preferably less than 50%, and most preferably less than 45% of [mmmm] pentad concentration, and having an isotacticity of more 10%, preferably more than 15%, more preferably more than 20%, and most preferably more than 25% of [mmmm] pentad concentration. Preferably, the polyolefinic homopolymer is polypropylene.

The isotacticity of the homopolymers may be reduced compared to the isotactic polypropylenes of the prior art due to a statistic distribution of stereoscopic errors in the polymer chain. The term "stereoscopic error" refers to a stereoscopic sequence characterized by a [mrrm] pentad. In this case, the central monomer has a stereo configuration opposed to the other four monomers in this pentad. The [mrrm] pentad concentration of this polymer therefore is above the statistical probability of $p^2 (1-p)^2$ where p=[m] and hence 1−p=[r] and $p^4$=[mmmm]. Preferably, the pentad concentration is at least $[p (1-p)]^q p (1-p)$ with q being 0.8, more preferably q being 0.6, yet more preferably q being 0.4, yet more preferably q being 0.2, most preferably q being 0.1.

In some embodiments of the homopolymer and in particular in those embodiments where the crystallinity is reduced by means of single stereo errors, a low content of atactic sequences has proven beneficial to the properties of the blend of the present invention. Preferably, the [rmrm] pentad concentration is below 6%, more preferably below 5%, yet more preferably below 4%, yet more preferably below 3%, most preferably below 2.5%.

In some embodiments of the homopolymer and in particular in those embodiments where the crystallinity is reduced by means of single stereo errors, a low content of syndiotactic sequences has proven beneficial to the properties of the blend of the present invention. Preferably, the [rrrr] pentad concentration is below 6%, more preferably below 5%, yet more preferably below 4%, yet more preferably below 3%, most preferably below 2.5%.

Alternatively, the homopolymer of the present invention may include sequences of atactic and isotactic blocks of polymer.

Preferably, the mean molecular weight $M_w$ of the polymer is above 100000 g/mol, more preferably above 200000 g/mol, yet more preferably above 300000 g/mol, yet more preferably more than 400000 g/mol, most preferably more than 500000 g/mol. For some applications such as adhesive applications, it may be desirable to have a mean molecular weight of the polymer of less than 100000 g/mol.

The glass temperature $T_g$ is between −50 and +30° C. Preferably the glass temperature is below 10° C., more preferably below 5° C., yet more preferably below 0° C., most preferably below −6° C. The melt temperature of the polymer is obtained after heating the sample 150° C. and subsequently cooling the polymer to −50° C.

Without wishing to be bound by this theory, the polyolefinic polymers exhibit a semi-crystalline structure. The structure may contain elastic amorphous areas of nano-scale-size reinforced with self arranged crystalline domains of nano-crystals. The formation of brittle macro-crystalline material from the polymer may potentially be achieved by introducing the defects into the polymeric backbone. Isolated monomer units with opposite stereo configuration, i. e. single stereo errors, can potentially be used as the defects.

Suitable polymers and a process for manufacturing such polymers are described in PCT patent application EP99/02379 incorporated herein by reference. A catalyst combination suitable for the preparation of such polymers is described in PCT patent application EP99/02378 incorporated herein by reference. Other suitable polymers and catalyst/process for polymerizing them are disclosed in EP patent application 00126192.4 incorporated herein by reference. Preferably, the processes of PCT patent application EP99/02378 and EP patent application 00126192.4 are carried out by temperatures of less than 50° C., more preferably less than 30° C., yet more preferably less than 25° C., yet more preferably less than 20° C., most preferably less than 15° C. to increase the molecular weight of the resulting polymer. In order to increase the molecular weight, the polymerization is preferably carried out in liquid monomer such as in liquid propene. In order to increase the molecular weight, the catalyst is preferably used in combination with the boron activators mentioned in PCT patent application EP99/02378. Other suitable polymers and a process for manufacturing such polymers is described in WO99/20664 incorporated herein by reference.

It is preferred to use homopolymers for the compositions of the present invention since during manufacture of homopolymers the batch to batch variability is greatly reduced in comparison to multi phase polymers where the phases are polymerized in a single reaction.

Preferably, the polyolefinic homopolymers used in manufacturing the compositions of the present invention have a distinctive rubber-elastic plateau in their stress-strain curves.

The polyolefinic homopolymers used for the composition of the present invention are bio-compatible may be burnt without toxic residues since they contain no heteroatoms such as chlorine. The further do not contain toxic monomer residues.

The specific chemistry of the polymeric composition of the second component is chosen to optimize the compatibility with the polymeric composition of the first component. Inventors have found that typically a second component which is based on the same monomer as the first component works well for the present invention. Having a composition in which all components are based on the same monomer exhibits a largely increased recyclability.

The second component preferably is comprised in the polymeric composition of the present invention at a concentration of less than 100 percent by weight of the first component, although higher contents of the second component may be desirable for specific applications. Furthermore, the polymeric composition of the present invention preferably is comprising the second component at a concentration of at least five percent by weight of the first component. The specific concentration of the second component will be chosen by the skilled person with regard to the objective of the polymeric composition. The specific concentration of the second component allows to adjust the material properties of the final polymeric composition in particular in terms of mechanical properties and of processability.

In the composition of the present invention, the addition of the second component will improve many material properties of the first component such as impact resistance, elasticity, and extensibility. For example, the composition has proven to exhibit excellent material properties such as elasticity and heat bondability in fibers.

It is a further aspect of the present invention to provide a polymeric composition comprising a first component and a second component as specified above and an additional third component. In this composition, the third component is intended to adjust the material properties of the first component and is typically immiscible with the first component. The second component in this composition act as a compatibilizer between the first component and the third component.

The third component is a polymeric material comprising a C2 to C20 linear or branched stereo regular polyolefin which is not freely miscible with the first component. Preferably, the polyolefin of the first component is polypropylene. More preferably, the polypropylene is linear. The manufacture of this third component is well known in the art such as for example by metallocomplex catalysis polymerization.

The third component preferably is comprised in the polymeric composition of the present invention at a concentration of less than 50 percent by weight of the first component. Furthermore, the polymeric composition of the present invention preferably comprises the third component at a concentration of at least 5 percent by weight of the first component. The specific concentration of the third component will be chosen by the skilled person with regard to the objective of the polymeric composition. The specific concentration of the third component allows to adjust the material properties of the final polymeric composition in particular in terms of mechanical properties and of processability.

In this polymeric composition, the second component acts as a compatibilizer between the first component and the third component. The second component preferably is present in this polymeric composition at a concentration of less than 50 percent by weight of the third component. Furthermore, the second component is preferably present in this polymeric composition at a concentration of at least five percent by weight of the third component. The specific concentration of the second component will be chosen by the skilled person with regard to the objective of the polymeric composition. In particular, the concentration of the second component has to be chosen sufficiently high in order to render the first component and the third component miscible with each other.

There are known in the art a wide variety of suitable methods to manufacture and/or to further process bodies from the polymer blends of the present invention including but not being limited to injection molding, extrusion blow molding, extrusion, casting, solution sedimentation, thermoforming, laser forming, carving, combination thereof, and the like.

It is a further aspect of the present invention to provide an article comprising a polymer blends according to the present invention.

The article according to the present invention may be a hygienic article. The term "hygienic article" as used herein refers to articles which are intended to be used in contact with or in proximity to the body of a living being. Such hygienic articles may be disposable or intended for multiple or prolonged use. Such hygienic articles include but are not limited to catheters, tubing, drainage systems, syringes, grafts, prosthetics, body implants, instrumentation, support means, toothbrushes, bed covers, stents, gaskets, pump diaphragms, baby bottle nipples, pacifiers, and the like. Having regard to the specific advantages of the polymers used for the articles of the present invention, it will be readily apparent to the skilled practitioner to apply the bodies of polymeric material according to the present invention in the above and similar hygienic articles.

The article according to the present invention may be a household article. The term "household article" as used herein refers to articles intended to be used when running a household. The household articles of the present invention include but are not limited to bottles, garbage bins, storage containers, hoses, toys, kitchenware, clothing, shoes, furniture in particular garden furniture, sporting goods, bellows, and the like. Having regard to the specific advantages of the polymers used for the articles of the present invention, it will be readily apparent to the skilled practitioner to apply the bodies of polymeric material according to the present invention in the above and similar household articles.

The article according to the present invention may further be an automotive part including but not being limited to bumper fascia, air dams, side moldings, fender flares. Grills, body panels, ducts, tires, vibration dampers, flexible joints, window seals, interior parts, door gaskets, automotive boots, and the like. Having regard to the specific advantages of the polymers used for the articles of the present invention, it will be readily apparent to the skilled practitioner to apply and to optionally modify the bodies of polymeric material according to the present invention in the above and similar automotive parts.

The polymer blends according to the present invention may also be used as a construction element in an article. Thereby, the functionalities of the body of polymeric material includes but is not limited to supporting, carrying, fixing, protecting other elements of the article and the like. Such articles include but are not limited to cover parts, complex constructions such as buildings (weather stripping, expansion joints, door gaskets and seals, water gaskets, window seals, hoses, ducts, tubes, wire and cable insulation, floor coverings, and the like), cars, household appliances, horticultural and agricultural constructions, and the like. Having regard to the specific advantages of the polymers used for the articles of the present invention, it will be readily apparent to the skilled practitioner to apply and to optionally modify the bodies of polymeric material according to the present invention as construction elements in the above and similar articles.

In general, the polymeric composition of the present invention is capable of replacing high art plastics for almost all purposes of the prior art plastics. Due to the adjust ability of the material properties of the polymeric composition of the present invention, the polymeric composition may be adapted to these purposes. In particular, the polymeric composition of the present invention are capable of replacing elastic or conformable plastics which has to be obtained by mixing platicizers into prior art polymers. While the prior art platicizers typically are toxic or at least incompatible with environment friendly disposal, the advantage of the polymeric composition of the present invention is that it overcomes the problems of prior art plastics comprising platicizers by being at least nontoxic, body tissue compatible, and may be burnt without toxic residues.

What is claimed is:

1. A polymeric composition comprising a first component and a second component, said first component being a first polymeric material comprising C2 to C20 linear or branched stereoregular polyolefins, characterized in that said second component is a second polyolefinic homopolymer having an isotacticity within the range of 25% to 60% of [mmmm] pentad concentration.

2. A polymeric composition according to claim 1 wherein the polymer in said second component has a mean molecular weight Mw within the range of from 100 to 3000 kg/mol.

3. A polymeric composition according to claim 1 wherein the polymer in said second component has glass temperature Tg of between −50 to +30° C.

4. A polymeric composition according to claim 1 wherein said polymeric composition comprises less than 50 percent by weight of said second component compared to said first component.

5. A polymeric composition according to claim 1 wherein said first polymeric material is isotactic.

6. A polymeric composition according to claim 1 wherein said first polymeric material comprises polypropylene.

7. A polymeric composition according to claim 1 wherein said polymeric composition comprises a third component, said third component being a third polymeric material comprising C2 to C20 linear or branched stereoregular polyolefins, the tacticity of said third polymeric material being different from the tacticity of the first polymeric material.

8. A polymeric composition according to claim 7 wherein said polymeric composition comprises less than 50 percent by weight of said third component compared to said first component.

9. A polymeric composition according to claim 7 wherein said polymeric composition comprises less than 50 percent by weight of said second component compared to said third component.

10. A polymeric composition according to claim 7 wherein said first polymeric material is isotactic and said third polymeric material is either syndiotactic or atactic.

11. A polymeric composition according to claim 7 wherein said first polymeric material is polypropylene and said third polymeric material is polypropylene.

12. An article comprising the polymeric composition of claim 1.

* * * * *